(No Model.)
T. HUGHES.
CLAMP FOR CRACKED HOOFS.
No. 376,441. Patented Jan. 17, 1888.
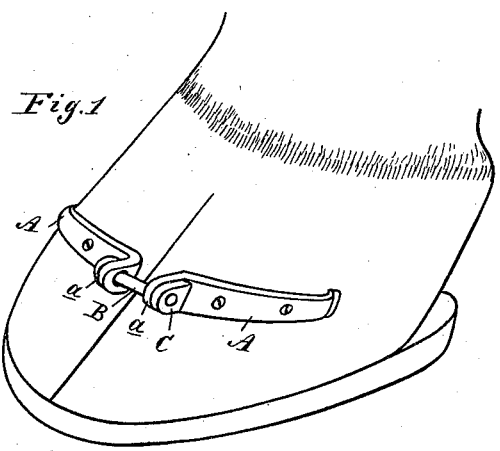
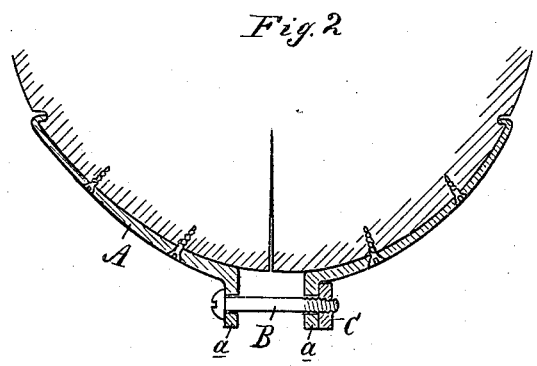
Attest:
John Schuman.
Inventor:
Thomas Hughes.
by his Atty
Thos. S. Sprague.

UNITED STATES PATENT OFFICE.

THOMAS HUGHES, OF DETROIT, MICHIGAN, ASSIGNOR OF TWO-THIRDS TO WILLIAM L. BEARDSLEY AND G. S. HAZARD, OF SAME PLACE.

CLAMP FOR CRACKED HOOFS.

SPECIFICATION forming part of Letters Patent No. 376,441, dated January 17, 1888.

Application filed May 27, 1886. Serial No. 203,410. (No model.)

*To all whom it may concern:*

Be it known that I, THOMAS HUGHES, of Detroit, in the county of Wayne and State of Michigan, have invented new and useful Improvements in Clamps for Cracked Hoofs; and I do hereby declare that the following is a full, clear, and exact description thereof, reference being had to the accompanying drawings, which form a part of this specification.

This invention relates to certain new and useful improvements in clamps for cracked hoofs.

The object of the invention is to provide a cheap and simple clamp to be secured to the hoof of the animal across the crack, and having means for tightening the same entirely disconnected from the shoe, so that the latter may be removed and replaced at pleasure without disturbing the clamp, which is so secured as not to produce any effect upon the heel of the animal.

The invention consists in the peculiar construction of the parts and their combination, as more fully hereinafter described.

Figure 1 is a perspective view of my improved clamp as attached to a cracked hoof. Fig. 2 is a longitudinal section through the same on the center line of the clamp.

In the drawings, A represents the two parts of the clamp, the outer ends of which are bent inward at right angles to the main body, or nearly so. The opposite ends are each provided with ears $a$, through which the adjusting-screw B passes, such screw being secured by the nut C. Each one of these parts A is provided with one or more holes through which short screws are employed to attach the parts, one on each side of the crack, there first having been cut small recesses in the hoof to receive the inwardly-turned ends of the two parts of the clamp. At the point where it is best to attach this clamp the shell of the hoof is sufficiently thick to allow these recesses to be cut and short screws to be employed to attach the clamp to the hoof without injury thereto.

I am aware of the Patent No. 309,690, and make no claim to the construction shown therein as forming part of my invention.

I deem it important that the two parts of the clamp be secured to the hoof by the screws, as shown, whereby, should the tightening means become loose, the parts of the clamp will not become detached from the hoof. Furthermore, the peculiar form of the parts of the clamp allows of the use of a screw-rod and prevents pressure of the clamp on the cracked portion of the hoof.

What I claim as my invention is—

The clamp described, consisting of the two parts A, each of which is provided with ears $a$, at right angles to the main body, and each part permanently secured to the hoof by means of screws, as shown, the adjusting-screw B, passed through holes in said ears, and the adjusting-nut C on the end of said screw, substantially as and for the purposes specified.

THOMAS HUGHES.

Witnesses:
H. S. SPRAGUE,
CHAS. THURMAN.